(12) United States Patent
Ahmed et al.

(10) Patent No.: US 11,963,167 B2
(45) Date of Patent: Apr. 16, 2024

(54) METHOD AND NETWORK NODES FOR ENABLING DOWNLINK SCHEDULING FOR A SPS AND DRX CONFIGURED UE

(71) Applicant: Telefonaktiebolaget LM Ericsson (publ), Stockholm (SE)

(72) Inventors: Saad Naveed Ahmed, Sundbyberg (SE); Anders Ohlsson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 425 days.

(21) Appl. No.: 17/312,906

(22) PCT Filed: Nov. 22, 2019

(86) PCT No.: PCT/SE2019/051184
§ 371 (c)(1),
(2) Date: Jun. 10, 2021

(87) PCT Pub. No.: WO2020/122788
PCT Pub. Date: Jun. 18, 2020

(65) Prior Publication Data
US 2022/0053530 A1 Feb. 17, 2022

Related U.S. Application Data

(60) Provisional application No. 62/777,462, filed on Dec. 10, 2018.

(51) Int. Cl.
*H04W 72/04* (2023.01)
*H04W 72/1273* (2023.01)
(Continued)

(52) U.S. Cl.
CPC ....... *H04W 72/1273* (2013.01); *H04W 72/04* (2013.01); *H04W 72/23* (2023.01); *H04W 76/28* (2018.02)

(58) Field of Classification Search
CPC . H04W 72/1273; H04W 72/04; H04W 72/23; H04W 72/12; H04W 76/28; H04L 1/1887; H04L 1/1671
See application file for complete search history.

(56) References Cited

U.S. PATENT DOCUMENTS 11,166,285 B2 * 11/2021 Kim ...................... H04W 80/02
2009/0239566 A1 * 9/2009 Pelletier .............. H04W 56/005
455/517

(Continued)

FOREIGN PATENT DOCUMENTS

CN 104919879 A 9/2015
CN 108702706 A 10/2018
(Continued)

OTHER PUBLICATIONS

European Search Report and Search Opinion, EP App. No. 19894614. 7, dated Jul. 18, 2022, 10 pages.

(Continued)

*Primary Examiner* — Mahbubul Bar Chowdhury
(74) *Attorney, Agent, or Firm* — Nicholson De Vos Webster & Elliott LLP

(57) ABSTRACT

A method in a User Equipment (UE) configured with Discontinuous Reception (DRX) and a method in a network node for Downlink (DL) scheduling of the UE. The UE is further configured with Semi Persistent Scheduling (SPS) which reduces the latency in Uplink (UL) transmission. The network node monitors a receipt of UL data in any of the SPS resources granted to the UE, a Wake-up grant or assignment is sent on the Physical Downlink Control Channel (PDCCH), and a HARQ-information is sent in response to the received UL data. The Wake-up grant/assignment triggers a drx-Inactivity timer to run in the UE. While the UE is DRX active, the network node may schedule a DL data (Continued)

transmission and send a DL assignment and the DL data to the UE.

15 Claims, 11 Drawing Sheets

(51) Int. Cl.
    *H04W 72/23*     (2023.01)
    *H04W 76/28*     (2018.01)

(56) References Cited

U.S. PATENT DOCUMENTS

| | | |
|---|---|---|
| 2011/0026631 A1 | 2/2011 | Zhang et al. |
| 2012/0093118 A1* | 4/2012 | Peters ................. H04L 5/0053 370/329 |
| 2013/0021995 A1 | 1/2013 | Ehsan et al. |
| 2013/0242826 A1 | 9/2013 | Black et al. |
| 2014/0198699 A1 | 7/2014 | Makharia et al. |
| 2015/0124671 A1 | 5/2015 | Tabet et al. |
| 2015/0215825 A1* | 7/2015 | Kim ..................... H04W 72/21 370/331 |
| 2016/0044641 A1 | 2/2016 | Bai et al. |
| 2016/0255676 A1 | 9/2016 | Vajapeyam et al. |
| 2017/0163388 A1* | 6/2017 | Wiemann ............... H04L 1/1887 |
| 2017/0202054 A1 | 7/2017 | Rathonyi et al. |
| 2017/0310431 A1 | 10/2017 | Iyer et al. |
| 2017/0373803 A1 | 12/2017 | Wu |
| 2018/0124724 A1 | 5/2018 | Tsai et al. |
| 2018/0145800 A1 | 5/2018 | Srivastav et al. |
| 2018/0270854 A1* | 9/2018 | Lee ....................... H04L 5/0044 |
| 2018/0302810 A1* | 10/2018 | Fujishiro ............... H04W 24/08 |
| 2018/0324847 A1* | 11/2018 | Lunden ................. H04W 72/23 |
| 2019/0037498 A1* | 1/2019 | Tseng .................. H04W 72/046 |

FOREIGN PATENT DOCUMENTS

| | | |
|---|---|---|
| CO | 2018/0007786 A2 | 8/2018 |
| WO | 2017/130737 A1 | 8/2017 |

OTHER PUBLICATIONS

International Preliminary Report on Patentability, PCT App. No. PCT/SE2019/051184, dated Jun. 24, 2021, 8 pages.
LG Electronics Inc, "Start of DRX timers out of Active Time", 3GPP TSG-RAN WG2 Meeting #101bis, R2-1806007, Apr. 16-20, 2018, 2 pages.
LG Electronics Inc, "Start of DRX timers regardless of regardless of Active Time", 3GPP TSG-RAN WG2 Meeting #101bis, R2-1806008, Apr. 16-20, 2018, 4 pages.
Nokia et al., "DRX for configured grant/assignment", 3GPP TSG-RAN WG2 #101, R2-1803232, Feb. 26-Mar. 3, 2018, 4 pages.
International Search Report and Written Opinion for Application No. PCT/SE2019/051184, dated Mar. 6, 2020, 10 pages.
3gpp ts 36.321 V15.3.0, "3rd Generation Partnership Project; Technical Specification Group Radio Access Network; Evolved Universal Terrestrial Radio Access (E-UTRA); Medium Access Control (MAC) protocol specification (Release 15)," Sep. 2018, 127 pages, 3GPP Organizational Partners.
Office Action and Search Report, CN App. No. 201980081976.7, dated Oct. 10, 2023, (10 pages of English Translation and 10 pages of Original Document).
Office Action, CO App. No. 20210007315, Dec. 28, 2023, 9 pages.

\* cited by examiner

METHOD AND NETWORK NODES FOR ENABLING DOWNLINK SCHEDULING FOR A SPS AND DRX CONFIGURED UE

CROSS-REFERENCE TO RELATED APPLICATIONS

This application is a National stage of International Application No. PCT/SE2019/051184, filed Nov. 22, 2019, which claims priority to U.S. Application No. 62/777,462, filed Dec. 10, 2018, which are hereby incorporated by reference.

TECHNICAL FIELD

The present invention relates to a method of scheduling a UE in a communication network and to a network node adapted for the scheduling.

BACKGROUND

3GPP cellular wireless systems, such as Long-Term Evolution (LTE) and New Radio (NR), use Discontinuous Reception (DRX) feature that allows the UE to stop monitoring the Physical Downlink Control Channel, PDCCH, during certain recurring time periods. This helps the UE to reduce battery consumption and increase the duration between recharging occasions.

A DRX cycle begins with a first phase called On-duration during which the UE is awake and monitors the PDCCH, followed by a second phase called Opportunity for DRX as shown in FIG. 1. There are thus two re-occurring states of reception. The UE is either active (awake) or inactive (asleep). The DRX cycle then comprise pre-configured regular periods of DRX activity, when the UE receiver is active and the PDCCH is monitored, that are referred to as On-duration. The total time during which the UE monitors the PDCCH is defined as the active time. This comprises the aggregate of phases On-duration as depicted in FIG. 1 but also all time when either of timers drx-InactivityTimer or drx-RetransmissionTimer is running. It also includes the time when UE awaits a contention resolution or an Uplink, UL, grant for either new transmission or adaptive retransmission.

The UE indicates its DRX capability to network (eNodeB/gNodeB) in initial context setup. The DRX capability may be: no, partial, or full support. The network then configures UE with a DRX setting. The network only schedules the UE during periods of active time.

The DRX configuration has a possible impact on the network capacity, such as the UE throughput. The purpose of the DRX configuration is to improve UE battery saving while it also results in some degradation of the system performance. The reduction in battery consumption versus the data throughput to the UE must be balanced in the best way by the DRX configuration.

A Service Specific DRX feature makes it possible to configure different DRX parameter settings for different services to optimize the DRX configuration for the respective service. In this way, UE battery can be saved with much less negative impact on the system performance. The Service Specific DRX feature uses QoS Class Identifier (QCI) dependent DRX settings which are defined by the operator.

Downlink, DL, and uplink, UL, transmissions are scheduled by the network node (eNodeB or gNodeB), while in the future it can be envisioned that the scheduling may be handled by the Cloud in full or partly. Scheduling can be done dynamically, i.e. the eNodeB schedules the UL transmission per transmission occasion defined as transmission time interval, TTI, or multiple TTIs (TTI bundling). FIG. 2 shows along a horizontal time line, an example sequence of events involving an eNodeB, eNB, in the upper line, and a UE that is configured with DRX, in the lower horizontal line. The eNodeB sends a dynamic grant to the UE during the On-duration phase of the DRX cycle that grants the UE resources on the Physical Uplink Shared Channel, PUSCH for transmission of new data. The receipt of the grant triggers the drx-Inactivity Timer to run and will keep the UE receiver active for 8 ms in the example, while the On-duration will run out after 4 ms. The UE will transmit data or a buffer status report, BSR, in the granted resources. A bit later, new data enters the UE transmit buffer, and the UE transmits a scheduling request, SR, on the Physical Uplink Control Channel, PUCCH. The SR transmission triggers the activation of the receiver until a dynamic grant is received. The receipt of the grant of resources for the transmission of the new data, triggers the drx-activity timer to run, in the example for a period of 8 ms. The transmission of data from the UE in the resources granted is not shown to keep the sequence of events simple in FIG. 2.

Alternatively, scheduling is made by the semi persistent scheduling, SPS, framework, wherein multiple periodic occasions are granted at the same time, i.e. prior to the arrival of all data at transmission buffers. Configuration of SPS includes the periodicity of the grant being signaled via RRC, and the activation of the configured grant is signaled via PDCCH. The activation grant indicates frequency resources, modulation and coding scheme, MCS, for future SPS occasions.

SPS was enhanced in LTE rel-14 to support latency reduction of UL data transmissions. As compared to UL dynamic scheduling, SPS can do UL transmission more quickly, since it removes the steps of the UE sending a scheduling request and the eNodeB responding by an UL dynamic grant. By the introduction of short SPS in release 14, latency is further reduced, as the SPS periodicity is reduced to less than 10 ms. Release 14 also includes the possibility to skip an uplink transmission when there is no data in the UE buffer. This option, referred to as skipUplinkTx, is available for both dynamic and SPS grants.

DRX with UL short-SPS presents special challenges to the scheduler in both UL and DL directions. A pending Scheduling Request, SR, sent by the UE on PUCCH, as is shown in FIG. 2, indicates to the network that the UE is awake and eligible for scheduling, as the UE will stay DRX active until it has received a scheduling grant or a SR period runs out.

The receipt of a dynamic scheduling message, either of a scheduling grant or a scheduling assignment on the PDCCH channel, for the transmission of new data, triggers a drx-InactivityTimer to run, and while running keeps the UE DRX active. While being DRX active the UE may receive further scheduling messages.

When the UE is UL SPS activated, it has a configured grant that it can use for UL transmissions on SPS occasions. This reduces the need of sending SR and waiting for dynamic scheduling messages granting uplink transmissions. With UL short-SPS the UE will not send SR under following scenarios:
  If the short-SPS interval is 1 ms (i.e. UL resource available all the time).
  If a logicalChannelSR-Mask is configured for a logical channel (LC) and data becomes available for this LC.

If an SR is triggered but cancelled due to the SPS interval occurring before the SR period expires, making UL resources available for transmission.

Under these conditions, the only occasion for the UE to be scheduled in downlink is during the DRX On-Duration. FIG. 3 similarly to FIG. 2 discloses sequence of actions in the eNodeB and UE along time lines but in the example of the UE being configured with SPS in addition to DRX. When new data arrives in the UE transmit buffer, the UE make use of the next SPS transmission opportunity for its transmission. However, upon the receipt of the data in the eNode B transmission buffer, a scheduling assignment can be received only when the UE is DRX active. However, waiting for the On-Duration to start until the scheduling assignment can be sent, increases the round-trip time (RTT) delay and hence the end-to-end latency for DL data. This defeats the purpose of UL short-SPS which targets latency minimization. So, while the short SPS UL configuration decreases UL latency it has a negative impact on the downlink transmission latency.

One way to improve the DL latency would be to disable DRX or use a lowest possible DRX configuration e.g. DRX cycle=20 ms. However, a delay to the next DRX On-Duration still must be tolerated. This would also increase the UE battery consumption.

There is a need to have a better balance between the UL and DL latency while at the same time avoid increase in battery consumption.

Accordingly, one object of the technology here presented is to improve the UL latency for a UE that is configured with DRX, and with short SPS in the UL, while at the same time avoid increase in battery consumption.

SUMMARY

Accordingly, one object of the technology presented is to reduce the latency in DL transmission for a UE configured with DRX and with SPS.

In one aspect there is a method in a network node for enabling DL scheduling of an UE configured with Discontinuous reception, DRX, including preconfigured recurring On-duration periods, to enable the DL scheduling in periods outside the On-duration periods. The UE is further configured with an UL semipersistent scheduling, SPS, granting the UE UL transmission in recurring Transmission Time Intervals, TTIs, short TTIs, slots or sub-slots. The method comprising the step of, monitoring a receipt of a transmission from the UE in any of the recurring TTIs, short TTI, slots or sub-slots of the SPS configuration; and responsive to the receipt of an UL transmission. It also comprises the step of transmitting a HARQ response to the UL transmission and at the same occasion transmitting an UL grant or a DL assignment to the UE, wherein the UL grant or DL assignment transmitted triggers the UE to stay in DRX active mode for a period.

In second aspect there is network node arranged for enabling DL scheduling of an UE configured with DRX including preconfigured reoccurring On-duration periods, and to enable the DL scheduling in periods outside the On-duration periods. The UE is further configured with an UL semipersistent scheduling, SPS, granting the UE UL transmission in reoccurring Transmission Time Intervals, TTIs, short TTIs, slots or sub-slots. The network node is arranged to monitor a receipt of a transmission from the UE in any of the recurring TTIs of the SPS configuration. The network node is further arranged to, responsive to the receipt of an UL transmission, transmit a HARQ response to the UL transmission and at the same occasion transmit an UL grant or a DL assignment to the UE, wherein the UL or the DL assignment grant triggers a drx-Inactivity timer to run, and while the drx-Inactivity timer is running the UE stays DRX active.

In third aspect there is network node arranged for enabling DL scheduling of an UE configured with DRX including preconfigured reoccurring On-duration periods, and to enable the DL scheduling in periods outside the On-duration periods. The UE is further configured with an UL semipersistent scheduling, SPS, granting the UE UL transmission in reoccurring Transmission Time Intervals, TTIs, short TTIs, slots or sub-slots. The Network node comprising a processing circuitry (1120) controlling the network node to, monitor a receipt of a transmission from the UE in any of the recurring TTIs, sTTIs, or slots of the SPS configuration. The processing circuitry (1120) further, and responsive to the receipt of an UL transmission, controlling the network node to transmit a HARQ response to the UL transmission and at the same occasion transmit an UL grant or a DL assignment to the UE, wherein the UL grant or the DL assignment triggers a drx-Inactivity timer to run, and while the drx-Inactivity timer is running the UE stays in DRX active mode.

In forth aspect there is network node arranged for enabling DL scheduling of a first UE configured with DRX including preconfigured reoccurring On-duration periods, and to enable the DL scheduling in periods outside the On-duration periods. The first UE is further configured with an UL semipersistent scheduling, SPS, granting the UE UL transmission in reoccurring Transmission Time Intervals, TTIs, short TTIs or slots. The Network node comprising a receiver arranged for receiving signal from the UE, a receiver arranged for receiving signal from the UE, and an UL scheduler for scheduling access to UL radio resources among one or more UE in contention for UL transmission. The network node further comprises a DL scheduler for scheduling access to UL radio resources among one or more UE in contention for UL transmission, wherein the UL and DL schedulers are connected to each other for exchange of information, and is connected to the transmitter for DL transmission of any scheduling decisions to the one and more UEs, and processing circuitry (1120). The processing circuitry (1120) controlling the network node to monitor a receipt of a transmission from the UE in any of the recurring TTIs, sTTIs or slots of the SPS configuration. The processing circuitry (1120) further controlling to, responsive to the receipt of an UL transmission, transmit a HARQ response to the UL transmission and in the same occasion transmit an UL grant or a DL assignment to the UE, wherein the UL grant or the DL assignment triggers a drx-Inactivity timer to run, and while the drx-Inactivity timer is running the UE stays in DRX active mode.

The technology presented provides the following advantages:

It reduces the DL latency in communications with the UE, while at the same time keeping the battery consumption at reasonable level.

DETAILED DESCRIPTION

Figure 1:
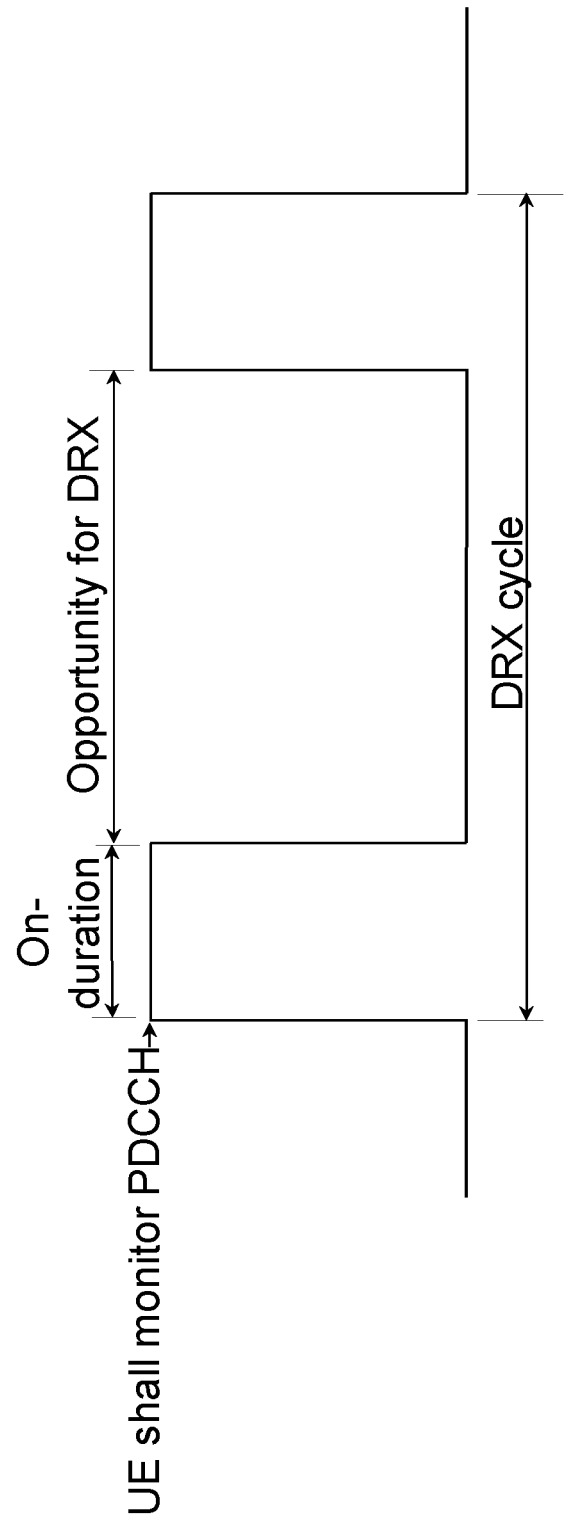
FIG. 1 is a time diagram illustrating different DRX states in the UE and the eNodeB monitoring of these states.
Figure 2:
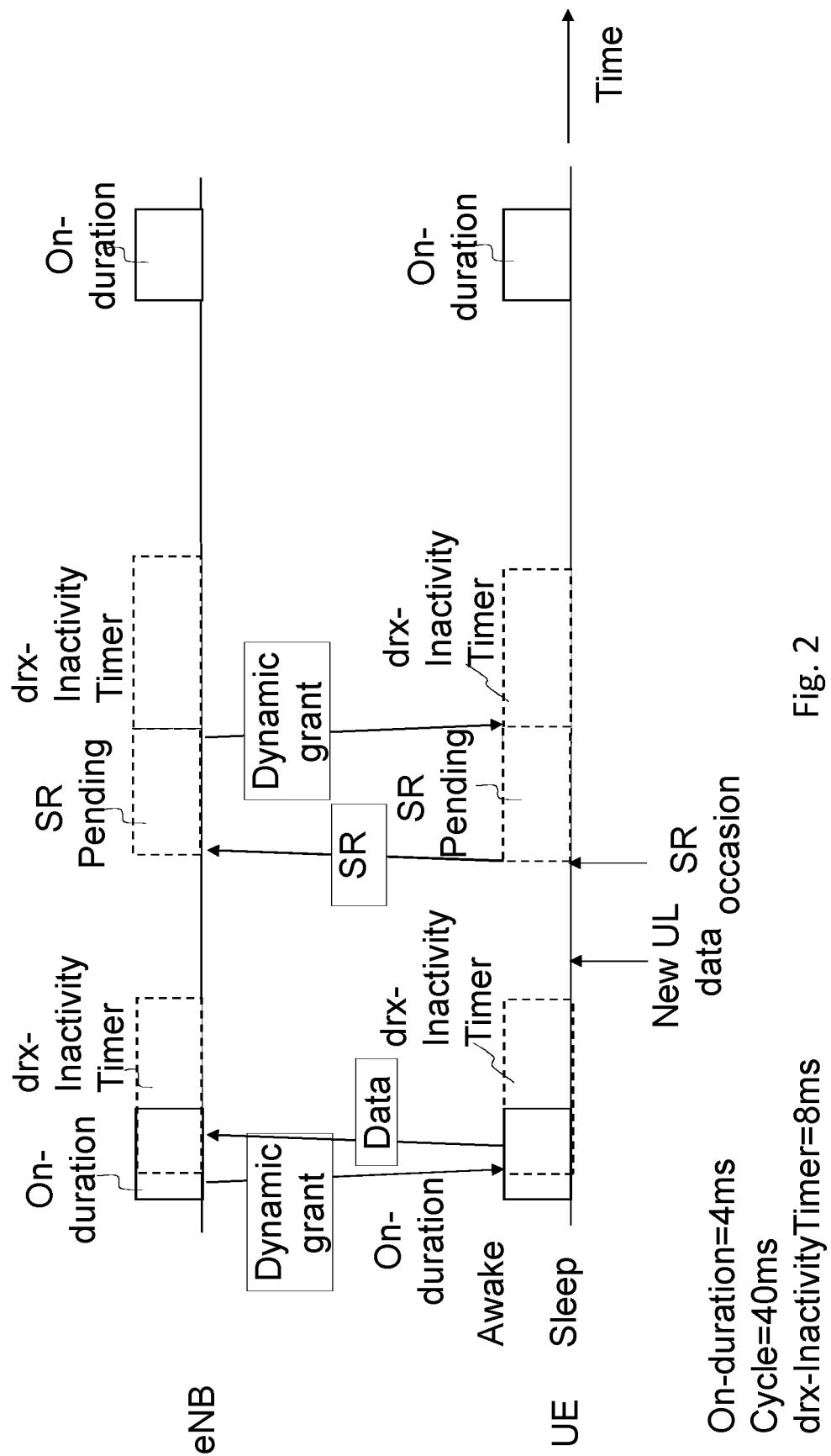
FIG. 2 is a time diagram illustrating different DRX states in the UE and the eNodeB monitoring of these states.
Figure 3:
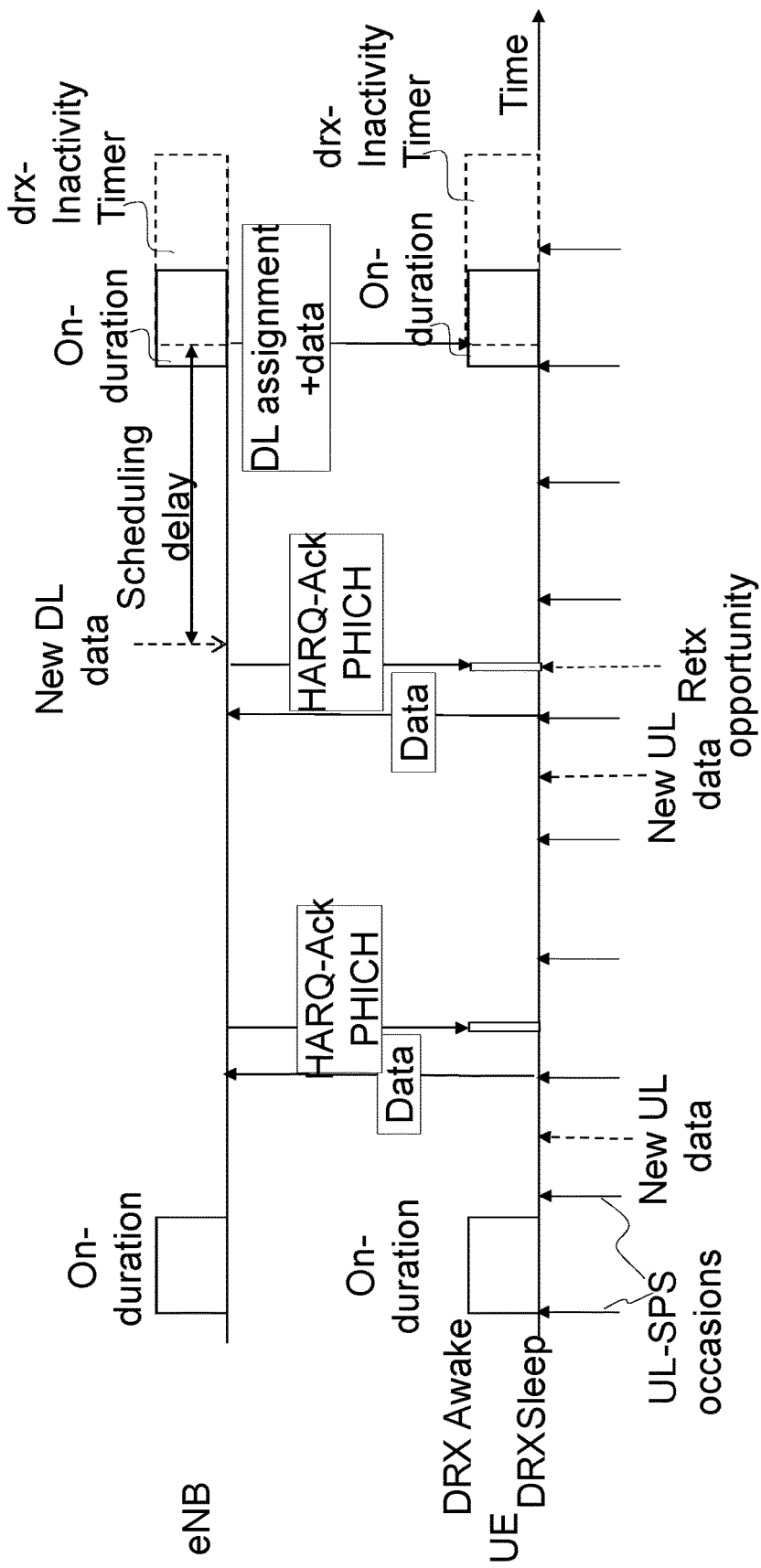
FIG. 3 is a time diagram illustrating different DRX states in the UE and the eNodeB monitoring of these states.

The technology here presented relates to a method in a network for keeping control of a User Equipment, UE, and the function typically resides in a network node co-functioning with a scheduler, such as a radio base station, an eNodeB, gNodeB, a remote radio head, a Radio Equipment, RE and Radio Equipment Controller, REC, or it may alternatively at least partly reside in functions in the Cloud in cooperation with any of the type of nodes mentioned. The node serves a specific UE with communication services and controls or obtains information that the UE is configured with Discontinuous Reception, DRX, and with an UL Semi-Persistent Scheduling SPS. The UL SPS configuration may be a short SPS. The information comprises the DRX cycle length, the occasions and length of the preconfigured active periods, also referred to as On-duration, and the drx-Inactive timer length.

The method is intended for a network node that possesses the described type of information for a specific UE and comprises steps that will here be described with reference to FIG. 4:

Step 410: Monitor the receipt of an UL transmission in any of the SPS preconfigured UL occasions on the Physical Uplink Shared Channel, PUSCH, that is used primarily for data transmission. In Rel. 14 the UE is not obliged to transmit in the SPS configured UL occasions, and when the UE does not have any data to transmit, nothing is sent. A UE configured with short SPS, also refrains from UL transmission unless it has UL data or a Buffer Status Report, BSR, to send. The SPS preconfigured UL occasions on PUSCH, may be any of regular Transmission Time intervals TTIs, short TTIs, slots or subslots and that provide opportunities for the UE to transmit in the UL.

Step 420: Responsive to data and or a BSR being received from the UE on the PUSCH in one of the SPS configured UL occasions, step 430 is performed. Else step 410 is continued.

Step 430: Transmit to the UE a HARQ response and at the same time transmit a dynamic UL grant or a DL assignment to the UE. The UL grant and the DL assignment is for the sending/receiving of new data from the UE. The UL grant and the DL assignment of new data triggers a drx-Inactivity timer to run in the UE and while it is running the UE stays DRX active.

The UL grant and the DL assignment thereby function as a Wake-up grant/assignment and that is sent for keeping the UE DRX active. While being DRX active the UE will monitor the Physical Downlink Control Channel, PDCCH, and may then receive a DL assignment from the network that schedules resources on the Physical Downlink Shared Channel, PDSCH, for DL data transmission. The Wake-up grant/assignment serves as an opportunity to open a period when a DL assignment may be sent to the UE for the transmission of the DL data. The Wake-up grant/assignment may be sent when there is data buffered for DL transmission but also when there is no data awaiting transmission in the downlink. The Wake-up grant or assignment may be sent for example when the network estimates that DL data will arrive while the drx-Inactivity timer will be running as a result of the Wake-up grant/assignment. By sending the Wake-up grant or assignment to the UE the network gets further opportunity to schedule the UE in the DL.

The proposed solution is based on 3GPP 36.321 5.7:
"When a DRX cycle is configured, the Active Time includes the time while:
an uplink grant for a pending HARQ retransmission can occur and there is data in the corresponding HARQ buffer for synchronous HARQ process;"

When the above condition applies the UE will be regarded as eligible for receipt of an UL scheduling grant. This is the situation when the UE has transmitted UL data or a BSR in one of the preconfigured SPS, or short SPS, occasions in the UL, during a window that is utilized in step 430 for sending the Wake-up grant/assignment.

The HARQ response is sent on the Hybrid-ARQ Indicator Channel, PHICH, in a process synchronized to the UL data transmission. In accordance with 3GPP 36.321 5.7 the UE will monitor the PDCCH when a HARQ response is due and may then receive an UL grant or a DL assignment. The UL grant and the DL assignment are in the form of a Downlink Control Information, DCI, message. The LTE principle is that the UL timing of any retransmissions of data is synchronized to the time of the first transmission. This is referred to as synchronous retransmission and avoids the need for sending UL grants for the retransmission. At the occasion when the HARQ response is due, the network may in addition to the HARQ response also send an UL grant or a DL assignment. In LTE the transmission timing of a HARQ response is synchronized the to the UL transmission timing and is typically made in the 1 ms transmission time interval, TTI, next to that of the receipt of the HARQ response. This time is typically too short to enable the scheduling of resources on the PDSCH for DL data that may be buffered for transmission to the UE. In the technology here proposed the transmission of a dynamic UL grant or a DL assignment with the HARQ response is utilized to trigger a drx-Inactivity timer to run and keep the UE DRX active while running. The dynamic UL grant/DL assignment thereby functions as a DRX wake up of the UE and that while being DRX active can receive a DL assignment on the PDCCH, and received DL data on the PDSCH.

Figure 6:
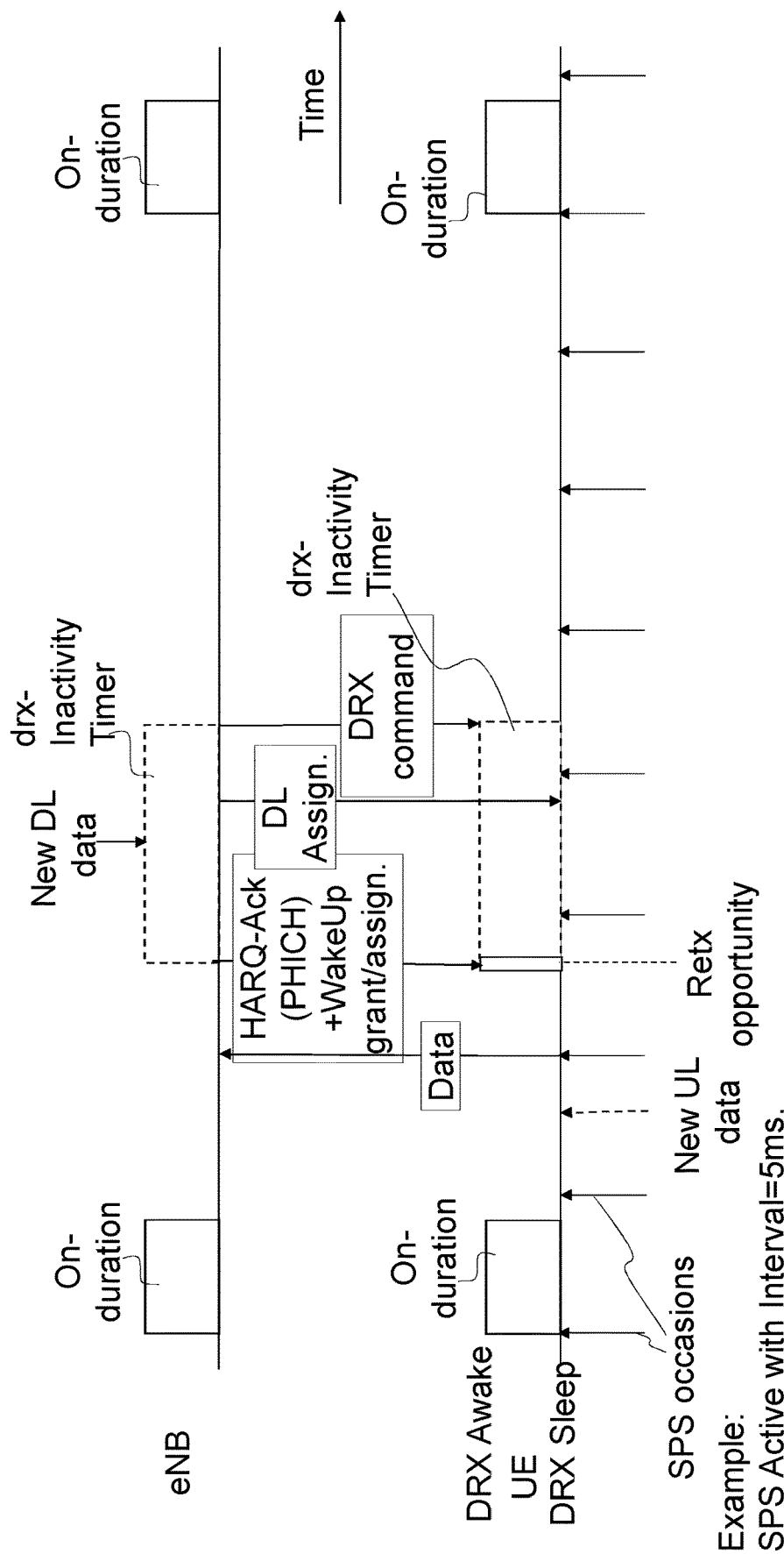
FIG. 6 is time diagram illustrating different DRX states in the UE and the NB monitoring of these states.
Figure 7:
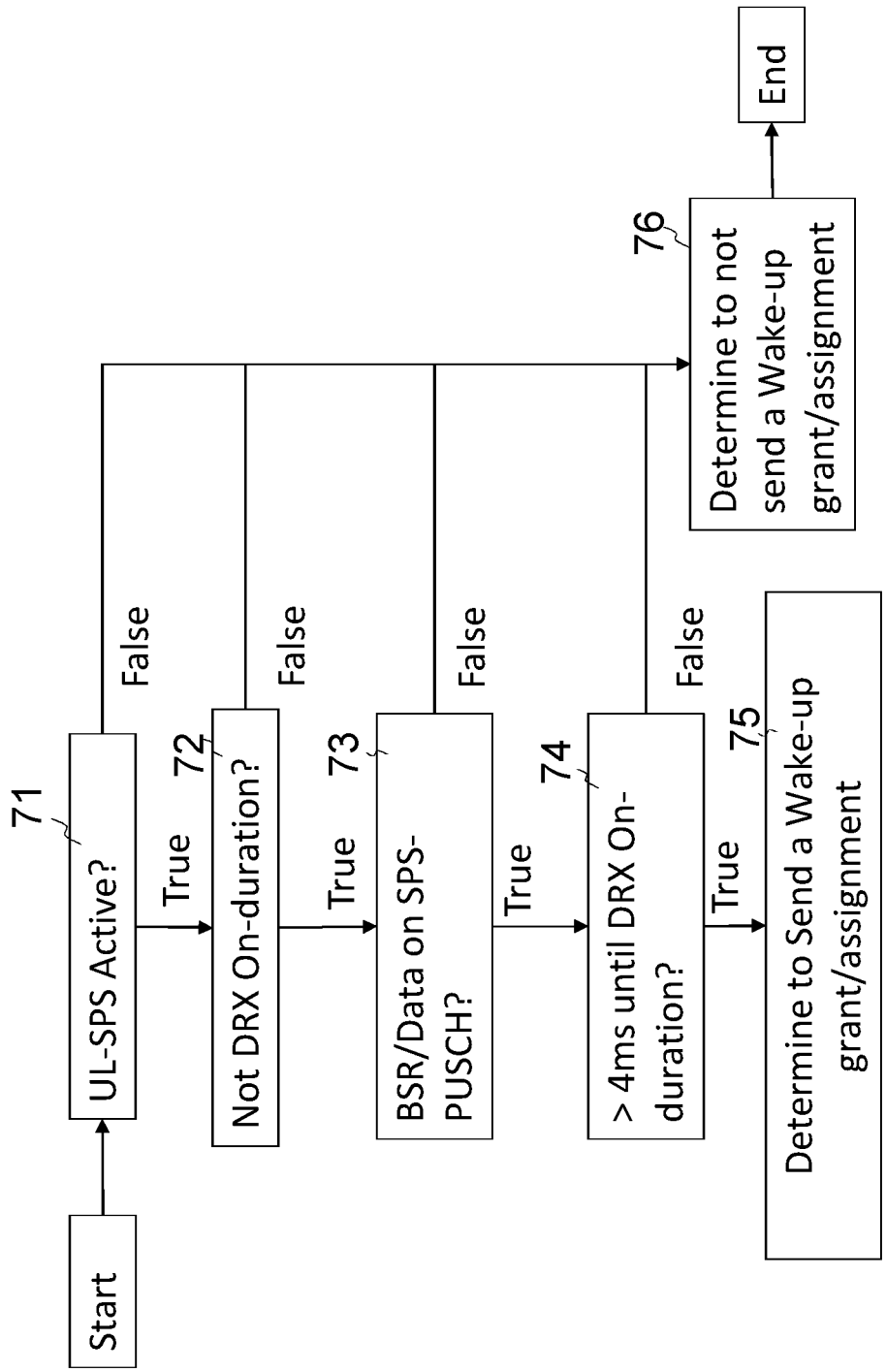
FIG. 7 is a flowchart of a method in a network node.
Figure 8:
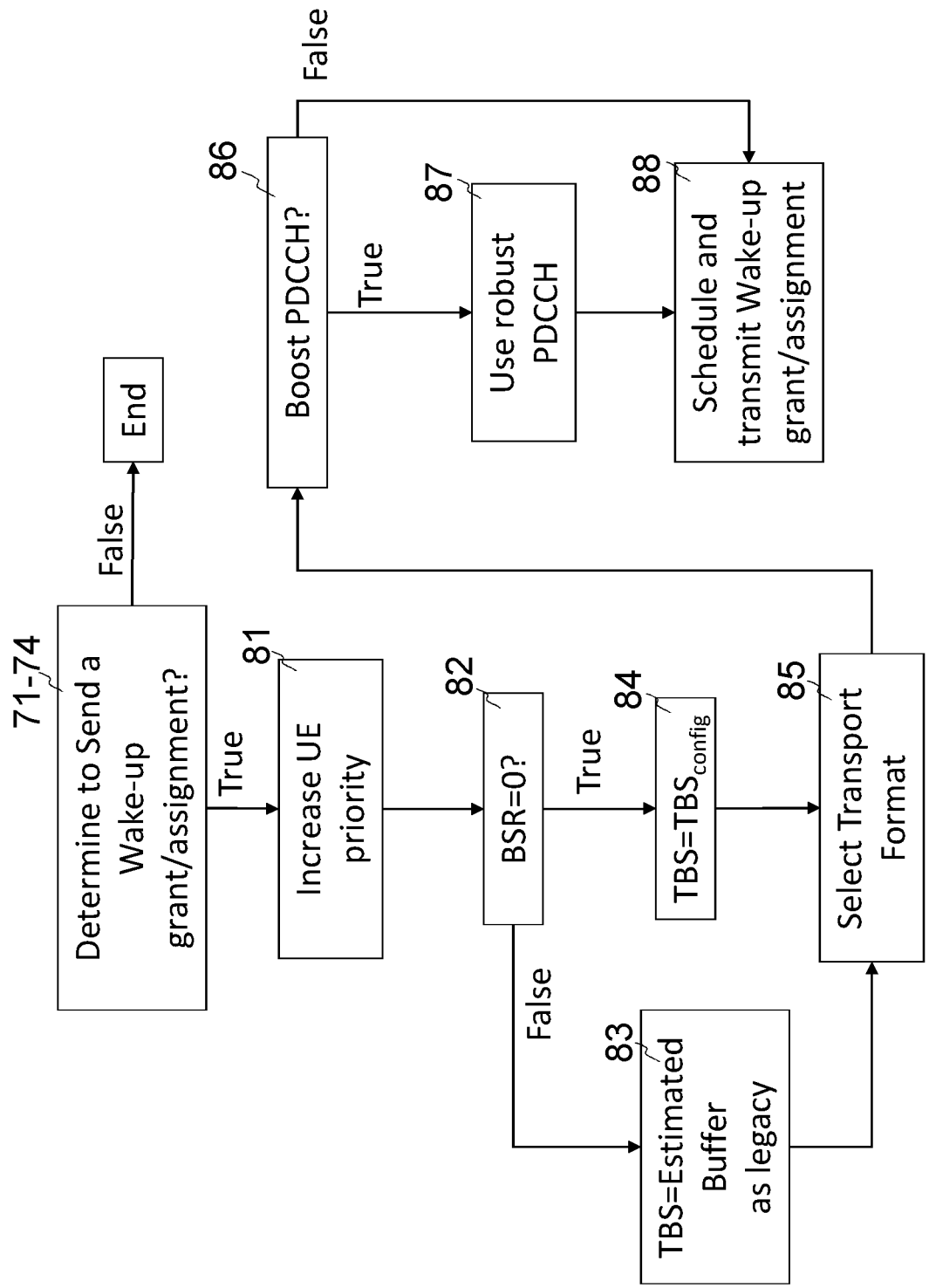
FIG. 8 is a flowchart of a method in a network node.
Figure 9:
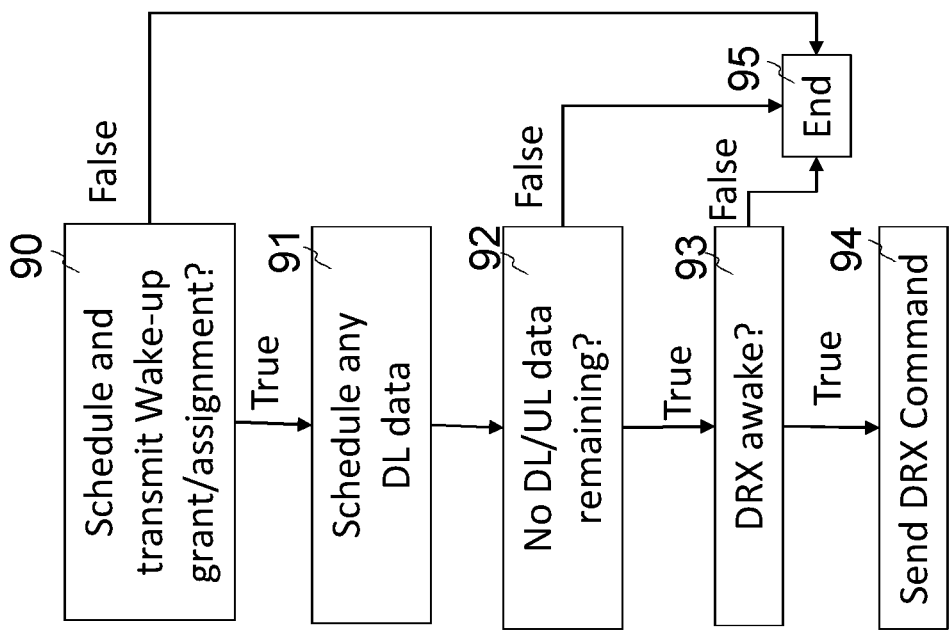
FIG. 9 is a flowchart of a method in a network node.

FIG. 6 illustrates a sequence of events along a horizontal time line of a UE (lower line) and that of a network node (upper line) and that is here presented by an eNodeB, eNB. The UE is configured with DRX, comprising preconfigured cyclic periods of On-duration when the UE monitors the PDCCH, followed by possible periods of DRX inactivity. In the example the On-duration is 4 ms and the cycle is 40 ms. The UE is also configured with short SPS, in the example granting the UL transmissions at preconfigured TTIs, short TTIs, slots or sub-slots with 5 ms interval, and that are illustrated in FIG. 6 by the regularly distributed arrows in upwards direction. The eNodeB monitors the periods of the DRX activity and SPS occasions and is aware of when the UE is DRX active. The eNodeB keeps its own receiver active over time. FIGS. 7, 8 and 9 illustrates steps performed by a network node according to some embodiments, and that may follow upon each other in sequence from FIG. 7 to FIG. 8 and further to FIG. 9. The proposed method may comprise following steps by the network node, and that are illustrated in FIG. 6, and in FIGS. 7, 8 and 9:

The eNodeB, for example its UL-scheduler, checks that UE is UL-SPS activated, step 71 in FIG. 7, and DRX asleep, in step 72. By example in FIG. 6, this is the situation just to the right of the first DRX On-duration period, when the UE has become DRX inactive.

The eNodeB UL-scheduler checks, in step 73, whether a BSR or UL data transmission is received on PUSCH in resources of the SPS or if nothing is received from the UE. In the example of FIG. 6, UL data, and/or a BSR is received from the UE at the second SPS UL grant occasion, illustrated by a "data" arrow in upwards direction from the UE to the eNodeB. In the example illustrated in FIG. 6 the UE is DRX asleep when transmitting the UL data.

Upon receipt of the BSR/UL data, i.e. the outcome of the check in step 73 is "true", the network node determines that UE is eligible for scheduling according to 3GPP 36.321 5.7. In the FIG. 6 example, the UE is configured with short SPS and configured to skip transmission of padding when there is no UL data or BSR for transmission on the SPS occasion. The first UL transmission thus includes data/BSR, and a HARQ response is due in the DL. In the example the eNodeB also determines to wake up the UE from DRX sleep, in step 75, and prepares for sending a dynamic UL grant or a DL assignment. The UL grant, or the DL assignment, is for a new transmission, and not just for a retransmission of the previous data, because a new transmission but not a retransmission triggers the drx-Inactivity timer to run.

The scheduler increases the UE priority, step 81, to ensure that the UE is scheduled. As the access to the shared data channel, PDSCH as PUSCH, is shared by many UE on contention basis, by increase of the UE priority the better chances that the UE will be scheduled at the right occasion. In case of preparing for the transmission of an UL grant the priority for UL scheduling is increased, and in case of a DL assignment being prepared the DL priority is increased.

The UL dynamic grant or the DL assignment is scheduled and transmitted to the UE, step 88, at the same occasion as the HARQ response transmission occasion. As, in the example of LTE, the HARQ response is synchronous to the UL transmission, the HARQ response timing is determined based on the time of the UL receipt. Time and occasion here correspond to a transmission time interval, TTI, or a short TTI in LTE, or may be a time slot in technologies other than the LTE such as NR. In the LTE "UL scheduled" means that an UL grant will be transmitted on the PDCCH, as is illustrated by the first arrow directed downwards from the eNodeB time line to the UE time line.

Before the UL grant or DL assignment is transmitted to wake up the UE from DRX sleep the further optional step may be performed:

The PDCCH is adapted to be robust, step 86 and 87 in FIG. 8, to ensure that the dynamic UL grant or the DL assignment is correctly received by the UE. A PDCCH is termed robust when it is assigned more CCEs than determined with regular link adaptation. The number of CCEs assigned to the PDCCH can be selected as any the values 1, 2, 4 and 8, and are normally selected based on the link quality.

In case it is determined that an UL grant shall be transmitted to wake up the UE from DRX sleep the further optional step may be performed before transmission:

If the UE reported zero BSR, a check is made in step 82, then a configurable Transport Block Size, TBS, will be used, as determined in step 84. The dynamic UL grant may adapt the format of the UL data transmission on the PUSCH, the TBS being one parameter and a small one is selected if the BSR is empty.

A PUSCH transport format, TFS, is selected, in step 85. TFS is a function which take SINR, required TBS as input, and output Modulation and Coding Scheme, MCS, Physical Resource Blocks, PRB and TBS. It can be implemented with different algorithms for different vendors. The implementation of this module is not the emphasis of this technology, it is therefore only referred as a black box function. In case it is determined that a DL assignment shall be transmitted to wake up the UE from DRX sleep it may further be observed that:

Also if there is DL buffered in the eNodeB for DL transmission to the UE when it is determined to wake up the UE by DL assignment, it may be preferred to schedule little resources on the PDSCH thereby improving the chances that the scheduling is made and scheduling grant transmitted in the critical occasion. If there is no DL data, dummy bits may be transmitted on the PDSCH.

The receipt of the dynamic UL grant triggers the drx-Inactivity timer to run and the UE becomes DRX active. In FIG. 6, this the period of drx-Inactivity timer when the UE enters the awake mode from the sleep mode is illustrated by a hashed line box. The eNodeB keeps a corresponding timer to monitor the time when the UE stays DRX active, and this period is also illustrated by a hashed line box on the eNodeB time line.

With drx-Inactivity timer running, it is now possible to schedule the UE in DL for the data transmission. In the example of FIG. 6, data arrives at the eNodeB DL buffer after the wake-up grant/assignment transmission. The eNodeB then schedules the DL transmission on the PDSCH and transmits a DL assignment on the PDCCH and that assigns the resources on the PDSCH in which the UE shall receive the DL data. The DL assignment for the data transmission is illustrated in FIG. 6 by the second arrow directed from the eNodeB time line to the UE time line. Though the transmission of just one DL assignment is illustrated in FIG. 6, it should be understood that depending on the amount of DL data waiting for transmission, the eNodeB may schedule and send DL assignments to the UE at several occasions. The DL transmission on the PDSCH are made in the same TTI, sTTI, or slot as that of the DL assignment.

When DL-scheduler has scheduled all available DL data, it may send a DRX Command MAC control element, CE, step 94 in FIG. 9, to the UE to put it back to DRX sleep. FIG. 6 shows the DRX command by an arrow going from the eNodeB time to the UE time line, and in response to its receipt the UE enters the DRX inactive state and ceases monitoring the PDCCH. Before step 94, is performed it may be checked that the UE is still DRX active, step 93.

Optional to what has been disclosed, the eNodeB could have skipped the Wake-up grant/assignment transmission if the UE would shortly be entering the DRX On-Duration period. By shortly is here typically meant 4 ms or less, albeit in some situations such as if there is no DL data available, and the traffic load generated by other UEs is high the Wake-up grant may optionally be skipped also if there are 5, 6 or even 7 ms until the next DRX On-duration period.

To improve the chances that the Wake-up UL grant/assignment is sent at a time that triggers the drx-Inactivity timer to run while DL data arrives at the eNodeB DL data buffer, the arrival timing of the DL data may be predicted.

The prediction may be based on the average time between UL data transmission on PUSCH and a corresponding arrival of data in DL, when both relates to the same Logical Channel, LC. The arrival is typical on the Radio Link Control, RLC, layer and handled per LC. The drx-Inactivity timer may then be set as equal to or greater than the average time between the UL transmission and the DL arrival of data.

In case the DL data has not arrived when the drx-Inactivity timer is about to run out, another Wake-up grant may be sent triggering the drx-Inactivity timer to restart.

Figure 4:
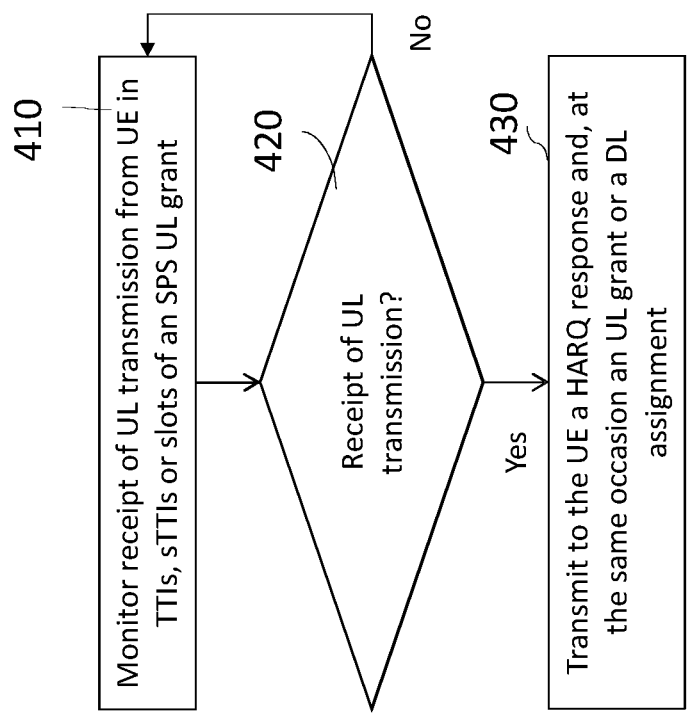
FIG. 4 is a flowchart of a method in a network node.
Figure 5:
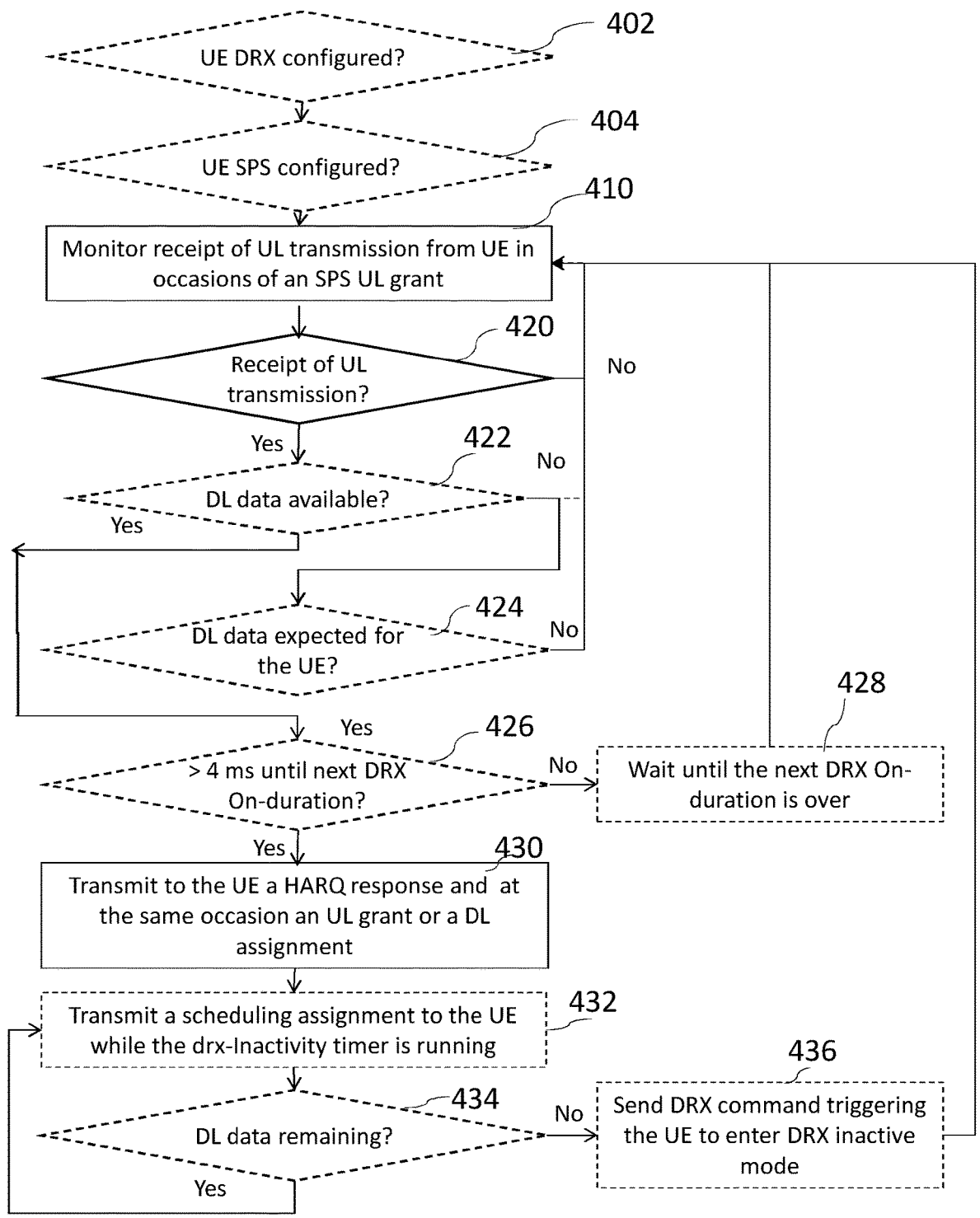
FIG. 5 is a flowchart of a method in a network node.

FIG. 5 is a flowchart that illustrates a method for a network node, such as the eNodeB, gNodeB, RE, REC, and that comprises optional steps in addition to those disclosed in FIG. 4. Steps that may optionally be included are indicated by hashed boarder lines in the flowchart:

Step 402: Optionally, it is checked that the UE is configured with DRX, and if so, what is the DRX cycle, On-duration period and timing. If the UE is DRX configured, the step 404 is performed, else the process is ended.

Step 404: Optionally, it is checked that the UE is configured with SPS in the UL. It optionally also be checked that the UE is configured with short SPS. If the UE is configured with SPS, or with short SPS, the step 410 is performed, else the process is ended.

Step 410: In this step the receipt of any PUSCH transmission from the UE is monitored just as is described in FIG. 4 and if received, i.e. the question in step 420 is answered by yes, step 422 is performed, else step 410 is repeated.

Step 422: Optionally, it is checked if there is any data buffered for DL transmission to the UE. If the answer is yes, step 426 is performed. If the answer is no, the method may be selected according to one of two alternatives. In the first alternative, no Wake-up UL grant will be sent to the UE when there is no data available in the DL buffer, and step 410 is repeated in a loop. In the other alternative, step 424 is performed.

Step 424: Optionally, it is estimated whether DL data will be received in a period of the drx-Inactivity timer if triggered by an UL grant. If the answer is yes, step 426 may be performed or alternatively skipped and then step 430 is performed. If the answer is no, step 410 is repeated in a loop.

Step 426: Optionally, it is checked whether there is a certain time until the UE will enter the DRX On-duration mode, and if not, transmission of a Wake-up UL grant is skipped, as the UE will nevertheless be possible to reach by a transmission on the PDCCH shortly. By shortly and certain time are here typically meant a time of 4 ms or less, albeit as discussed above it can also be longer in some situations. If it is confirmed, yes in step 426, that there is no upcoming On-duration period within a specified time limit step 430 will be performed next. If, however, the On-duration is to be entered within the specified time limit, the answer to the question is No and step 428 is performed next.

Step 428: Nothing is done until the next On-duration period has expired, and then step 410 is performed again and the other steps repeated in a loop.

Step 430: A HARQ response is transmitted at an occasion or a TTI that is given by the required fixed timing between an UL transmission and its HARQ response. At the same occasion or TTI an UL grant or a DL assignment is transmitted for the purpose of triggering the drx-Inactivity timer to run and thereby making the UE enter the DRX active mode. If there are no data waiting for DL transmission, and if no data arrives at the DL buffer while the UE is DRX active step 410 may be repeated when the drx-Inactivity timer runs out and the UE becomes DRX inactive, and the method continues in a loop, else step 432 is optionally performed.

Step 432: Optionally, a scheduling assignment is transmitted to the UE over the PDCCH, while the drx-Inactivity timer is running. The scheduling assignment assigns the resources on the PDSCH in which the UE shall receive the DL data. The purpose of sending this scheduling assignment is for transmission of DL data to the UE.

Step 434: This optional step may follow upon step 432, and it is checked whether there are any more DL data to transmit. If yes, then step 432 is repeated in a loop, and if not step 436 may be performed. Alternatively, and not depicted in FIG. 5, it may be predicted that DL will arrive while the drx-Inactivity timer is running and if so, step 436 is not performed. If data arrives at the DL buffer while the drx-Inactivity timer is running a further scheduling assignment may be sent to the UE. Alternatively, if it is predicted that DL data will arrive after the drx-Inactivity timer runs out, step 430 may then be performed again thereby triggering the drx-Inactivity timer to run again and keep the UE DRX active while the DL data arrival is predicted.

Step 436: A DRX command is optionally sent to the UE and triggers the UE to enter DRX inactive mode.

The NDI, in the DCI serving as Wake-up grant or as a Wake-up assignment is toggled to indicate new data, and thereby triggers the drx-Inactivity timer to run. Some resources on the PUSCH in the case of a Wake-up grant or some resources on the PDSCH, in the case of the of a Wake-Up assignment, need be scheduled. Time is short for the scheduling the Wake-up grant/assignment and if just a small amount of resources in the PUSCH/PDSCH are occupied, the better chance that the Wake-up grant/assignment can be sent. If there is no data buffered for transmission padding may be sent on either of the PUSCH and PDSCH.

The Wake-up grant/assignment is transmitted on the PDCCH in the same opportunity as the HARQ-response is transmitted on the PHICH, and that means that in the case of LTE that are transmitted in the OFDM symbols within a TTI that makes up the control region, or in case of short TIIs being used in LTE or in case of NR the sPDCCH and PHICH are coded over the same OFDM symbols.

The term UE, User Equipment, used in this description may refer not only to the end terminal as defined in the 3GPP specifications for the LTE or NR but may refer to any type of wireless device communicating with a node and/or with another wireless device in a cellular or mobile communication system. It should be noted that the "user" in the term "User Equipment" in no way restricts the terminal to be in the hands of a human user, but the UE may be a machine communicating with other machines. Examples of UEs include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A UE may also be referred to as, a station (STA), a device, or a terminal in some embodiments.

The term "network node" as is used can be any kind of network node that handles some of the scheduling functions, possibly in cooperation with the Cloud in which some of the scheduling functions such as policy settings or prediction of DL data arrival timing may be computed. The "network node" may comprise a Node B, base station (BS), multi-standard radio (MSR) radio node such as MSR BS, eNode B, base station controller (BSC), base transceiver station (BTS), or a part of a base station/eNodeB/gNodeB that may have a split architecture and then the function mainly resides in a Radio Equipment Controller, REC, a Equipment Controller, RE, relay donor node controlling relay.

In the examples disclosed names of channels in the LTE system have been used, while it should be understood that also channels with functions such as a Shared Downlink Data Channel, a Downlink Control Channel, a Shared Uplink Data Channel, and a Uplink Control Channel may be used despite their names may be other than the LTE PDSCH, PDCCH, PUSCH, and PUCCH.

Figure 10:
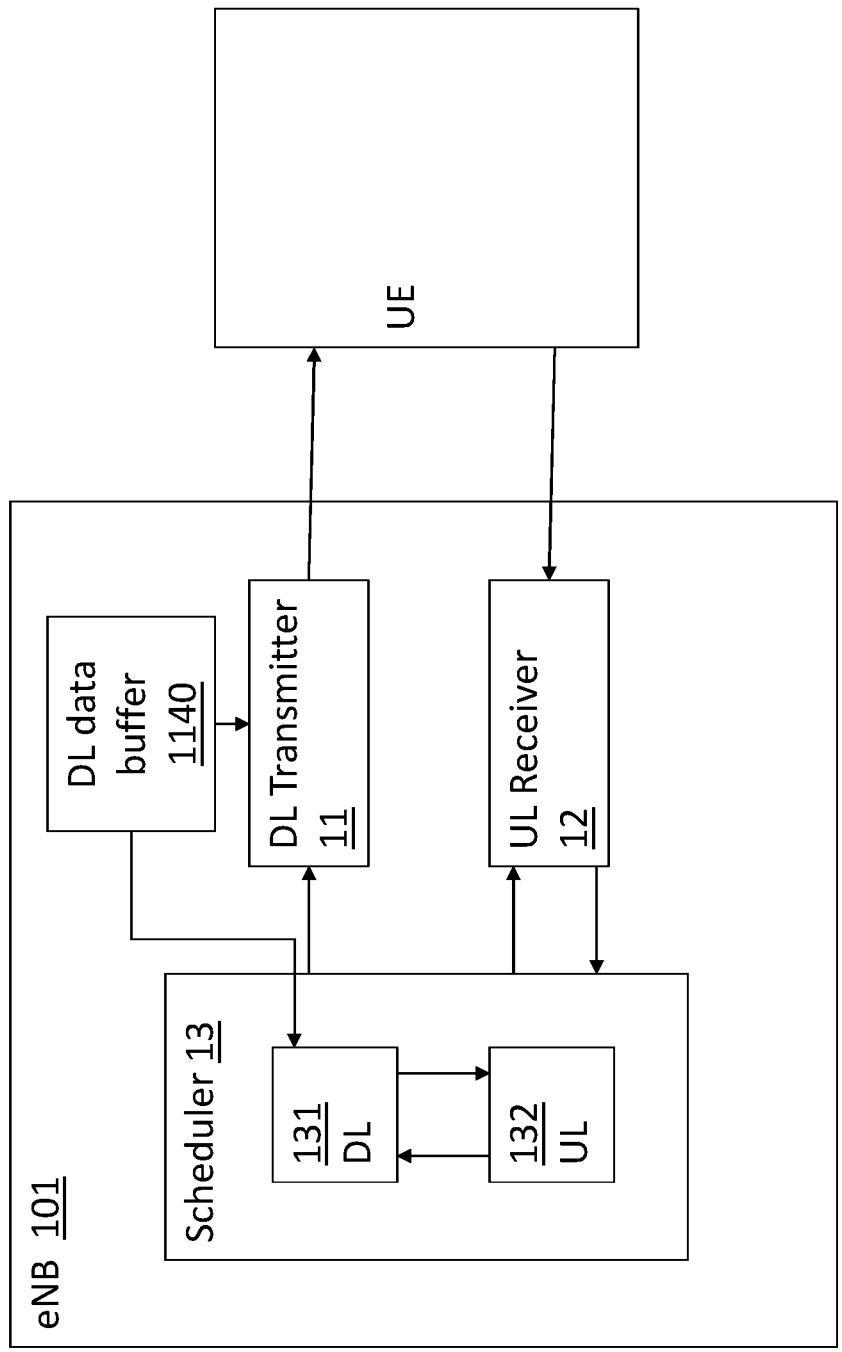
FIG. 10 is a block diagram of a network node.

FIG. 10 is a block diagram of a structure of a network node 101 that is adapted for the technology here proposed. Just the structures relevant for the technology proposed is shown for better overview. It comprises a DL transmitter 11, and an UL receiver 12, and a scheduler 13 with separate sections 131, 132 for scheduling resources on the PDSCH and the PUSCH in respectively the DL and the UL communication directions. The scheduler 13 is connected to the transmitter 11 and to the receiver 12. The transmitter 11 and receiver 12 are both adapted to transmit/receive over a radio interface, or are connected to respectively a radio transmitter and a radio receiver in another entity over for example a front haul network and that are not depicted in FIG. 10.

The general function of the scheduler 13 is to schedule the resources on the radio interface for communication with a plural UE in contention of the resources on the PDSCH and the PUSCH. When describing the technology of this application the focus is on the UE that is configured with DRX and SPS. The SPS configuration may be for a short SPS.

The scheduler communicates its scheduling decisions via the DL transmitter 11 to the UEs over the PDCCH in the form of DCI messages, as scheduling grants providing resources on the PUSCH for the UL transmissions and scheduling assignments providing resources on the PDSCH for the DL transmissions. DL data arrives to the network node 101 over, for example an S1 interface to the core network, that is not shown in FIG. 10, and a DL buffer 1140 buffers the data until it is scheduled and transmitted. The DL scheduler 131 is informed of the amounts of data in the DL buffer for the specific UE, and the UL scheduler 132 receives a BSR from the UE informing of the amount of data awaiting UL transmission. The scheduler 13 also assigns priorities to the different UEs, based on factors such as the amounts of data in their respective buffer, how long the data has been buffered, and the type of service that the UE is involved in. Which of the UEs that are scheduled are based on their respective priority. Scheduling in UL and DL are conventionally made in separate processes, and a specific UE may be given different priorities for the UL transmission and the downlink transmission. The DL buffer 1140, have sections for the data for the respective UEs.

The network node 101 is adapted to perform the functions as described with reference to FIG. 4. It may optionally also be adapted to perform the further functions as are described in the flowchart of FIGS. 5, 7, 8 and 9. In one embodiment the UL receiver 12 monitors the receipt of any UL transmission from the UE in the TTIs granted by SPS, or in the short TTIs granted by the short SPS, and informs the scheduler 13 when UL data or a BSR is received. The scheduler 13 may then control its UL scheduler 132 to trigger the transmission of the Wake-up UL grant in the same TTI, short TTI or slot as that of the HARQ response. The UL scheduler 132 then informs the DL scheduler 131 of the drx-Inactivity timer running. As an alternative to triggering the transmission of a Wake-up uplink grant the scheduler 13 may control the DL scheduler 132 to transmit a Wake-up DL assignment. The scheduler 13 in the embodiment of FIG. 10 possess information on the DRX process, including the periods in which the UE keeps its receiver active, i.e. is DRX active, and possesses information on the UE UL SPS configuration. The scheduler determines whether to send a Wake-up grant/assignment, in steps such as disclosed in FIGS. 4, 5, 7, 8 and 9. The scheduler may also determine whether a Wake-up grant or Wake-up assignment should be sent or not. Which one of the two alternatives to be used to Wake-up the UE receiver may for example be based on the load on the UL and DL, and if the DL has the better capacity a DL assignment is selected to Wake-up the UE.

Figure 11:
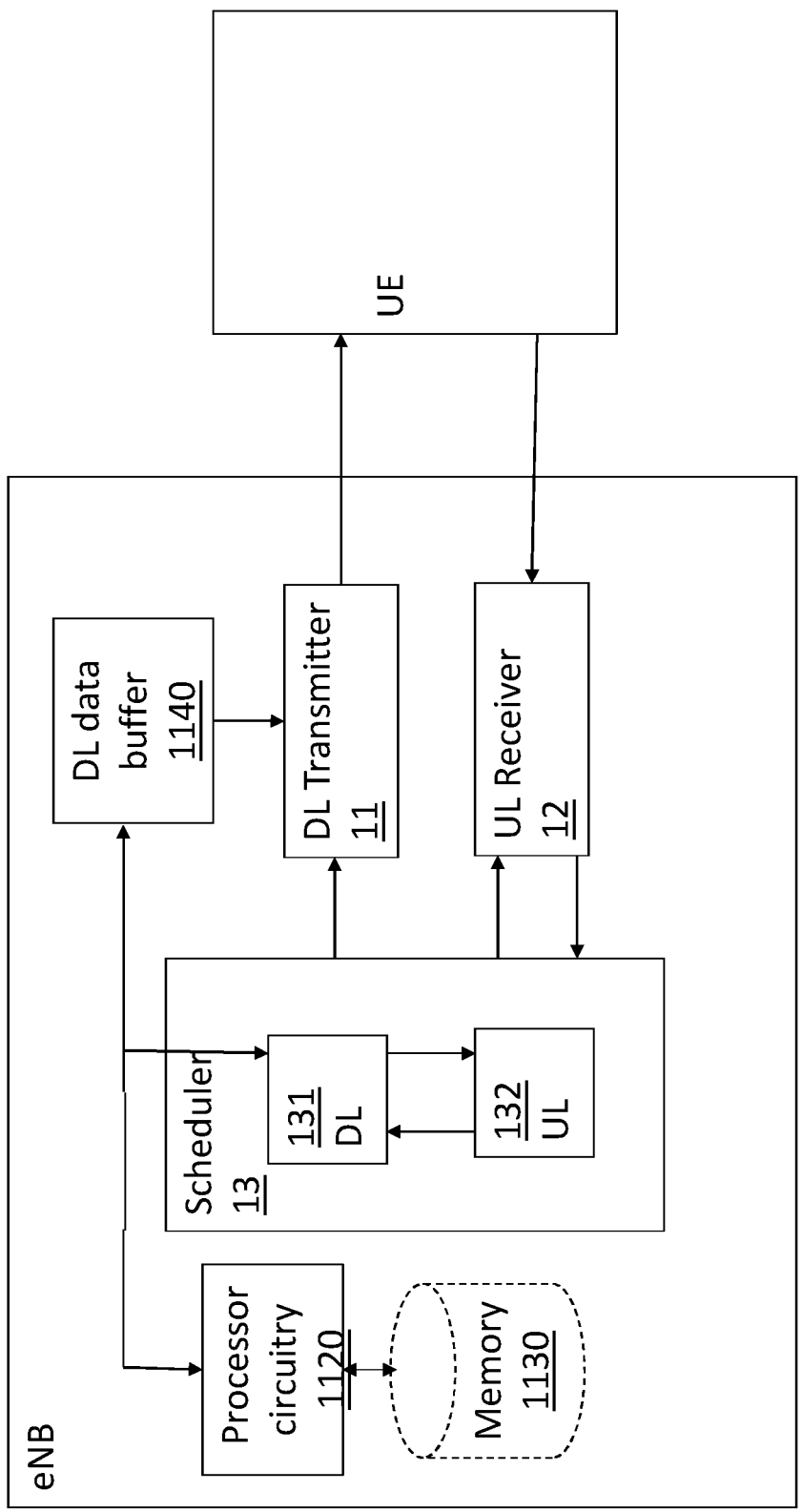
FIG. 11 is a block diagram of a network node.

In one embodiment disclosed in FIG. 11, there is a processor circuitry 1120 that controls the interactions between the transmitter 11, the receiver 12 and the scheduler 13. In this embodiment the processor circuitry 1120 keeps control over the DRX configuration in the UE, possesses information of the periods when the UE receiver is active and triggers the UL scheduler to schedule the transmission of the UL grant or the DL assignment in the same TTI or slot as that of the transmission of the HARQ response, for the purpose of Waking up the UE from DRX sleep. Optionally there may also be a memory 1130 that stores the instructions that when run on the processor circuitry 1120, makes the processor circuitry 1120 control the network node to perform the functions as discloses with reference to any of FIGS. 4, 5, 7, 8 and 9. In the alternative with no memory, the functions of the processor circuitry 1120 may be hard coded into the processor circuitry 1120.

It the technology presented here there is a first Wake-up grant or assignment that make the UE DRX active, and when the UE has become DRX active the DL assignments for DL data are transmitted. There are several reasons for the two-step approach. The Wake-up grant assignment is transmitted under short time constraints, that may not admit for the data being scheduled. Scheduling is complicated, decision are made under short time constraints, and the UL and DL are typically handled by separate sections 131, 132 of the scheduler 13 that work independently though information is exchanged. The UL scheduler controls the UL SPS grant to the UE and is configured to provide the HARQ responses and is configured to adapt the retransmission of data from the UE by transmitting an UL grant. The UL scheduler is therefore adapted from early releases of the standard to send a UL grant over the PDCCH at the same time as the HARQ response. The UL grant need just grant a small quantity of the PUSCH resource, for a single resource block, as its purpose is to wake up the UE from DRX sleep, and not to transmit UL data. The chances of succeeding in scheduling the UE in the same TTI as that of the HARQ-response improves by just a minor resource of the PUSCH is granted. The chances of succeeding in awaking the UE in the same TTI as that of the HARQ response improves by using a robust PDCCH.

Should there be limited capacity on the PUSCH, a DL assignment may alternatively be sent to wake up the UE from DRX sleep. The by assigning just some minor resources on the PDSCH or some minor resources on the PUSCH the better chances that the Wake-up assignment or the Wake-up grant will be scheduled at the same occasion as that of the HARQ-response transmission, whether it be the same TTI, the same sTTI, the same slot or the same sub-slot depending on the UE configuration.

The chances of the Wake-up grant/assignment being detected by the UE improves if the PDCCH carrying the Wake-up grant/assignment is made robust.

Moreover, those skilled in the art will appreciate that the functions and means explained herein may be implemented using software functioning in conjunction with a programmed microprocessor or general-purpose computer, and/or using an application specific integrated circuit (ASIC). It will also be appreciated that while the current invention is primarily described in the form of methods and devices, the technology may also be embodied in a computer program product as well as a system comprising a computer processor and a memory coupled to the processor, wherein the memory is encoded with one or more programs that may perform the functions disclosed herein.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Abbreviations and Acronyms

BSR Buffer Status Report
CE Control Element
DL Downlink
DRX Discontinuous Reception
DTX Discontinuous Transmission
LC Logical Channel
LTE Long term evolution
MAC Medium Access Control
MCS Modulation and Coding Scheme
NR Next Radio
PDCCH Physical Downlink Control Channel
PDSCH Physical Downlink Shared Channel
PRB Physical Resource Block
PUCCH Physical Uplink Control Channel
PUSCH Physical Uplink Shared Channel
RTT Round trip time
SR Scheduling Request
SPS Semi-Persistent Scheduling
TBS Transport Block Size
TFS Transport Format Selection
UL Uplink

EMBODIMENTS OF THE TECHNOLOGY

A. A method in a network node for enabling DL scheduling of an UE configured with DRX including preconfigured reoccurring On-duration periods, to enable the DL scheduling in periods outside the On-duration periods, and when the UE is configured with an UL semipersistent scheduling, SPS, granting the UE UL transmission in reoccurring Transmission Time Intervals, TTIs, said method comprising the steps of:
monitoring a receipt of a transmission from the UE in any of the reoccurring TTIs of the SPS configuration; and responsive to the receipt of an UL transmission,
B. transmitting a HARQ response to the UL transmission and at the same occasion transmitting an UL grant to the UE, wherein the UL grant triggers a drx-Inactivity timer to run, and while the drx-Inactivity timer is running the UE stays in DRX active mode.
C. The method of embodiment A further comprising, sending said UL grant conditional that there is data buffered for DL transmission.
D. The method of embodiment A further comprising, sending said UL grant conditional it is predicted there will be data for DL transmission in the period when the drx-Inactivity timer is running.
E. The method of embodiment C further comprising, predicting the time when data will be available for downlink transmission based on the average time for a specific logical channel between an uplink transmission and a corresponding downlink transmission, and the time of the receipt of the transmission from the UE.
F. The method according to any of embodiments A, B or C further comprising sending a scheduling assignment to the UE while the drx-Inactivity timer is running.
G. The method of embodiment A further comprising, sending said UL grant over the Physical Downlink Control Channel, PDCCH, by use of at least one more Control Channel Elements, CCE, than should have been used at normal link adaptation.
H. The method of embodiment A further comprising, sending said UL grant conditional that there is more than 4 m seconds until the next preconfigured period of DRX active mode.
I. The method of embodiment A further comprising, when a buffer status report received from the UE indicates there is no data for UL transmission, said UL grant adapts the size of an UL transport block to be less than the size of a transport block in the SPS configuration.
J. The method according to embodiment E wherein upon one or more downlink transmissions there are no more data to be transmitted in the downlink, DRX command is sent to the UE triggering the UE to enter DRX inactive mode.
K. The method of embodiment A further comprising, determining that the UE is configured with UL SPS and configured with DRX.
L. The method of embodiment A further comprising, configuring the UE with at least one of the UL SPS and the DRX.
M. The method according to any of the above embodiments in which the SPS configuration is a short SPS configuration, in which the multiple occasions for UL transmissions that are granted to the UE are spread by an interval of 10 m seconds or less.
N. The method according to embodiment L wherein the network configures the UE to refrain from sending in a SPS configured TTI unless there is a UL data or a Buffer Status Report.
O. A network node arranged for enabling DL scheduling of an UE configured with DRX including preconfigured reoccurring On-duration periods, and to enable the DL scheduling in periods outside the On-duration periods, when the UE is configured with an UL semipersistent scheduling, SPS, granting the UE UL transmission in reoccurring Transmission Time Intervals, TTIs, and being arranged to:
monitor a receipt of a transmission from the UE in any of the reoccurring TTIs of the SPS configuration; and responsive to the receipt of an UL transmission,
transmit a HARQ response to the UL transmission and at the same occasion transmit an UL grant to the UE, wherein the UL grant triggers a drx-Inactivity timer to run, and while the drx-Inactivity timer is running the UE stays in DRX active mode. A network node arranged for enabling DL scheduling of an UE configured with DRX including preconfigured reoccurring On-duration periods, to enable the DL scheduling in periods outside the On-duration periods, when the UE is configured with an UL semipersistent scheduling, SPS, granting the UE UL transmission in reoccurring Transmission Time Intervals, TTIs, being arranged to:
  monitor a receipt of a transmission from the UE in any of the reoccurring TTIs of the SPS configuration; and responsive to the receipt of an UL transmission,
  transmit a HARQ response to the UL transmission and at the same occasion transmit an UL grant to the UE, wherein the UL grant triggers a drx-Inactivity timer to run, and while the drx-Inactivity timer is running the UE stays in DRX active mode.

P. A network node arranged for enabling DL scheduling of an UE configured with DRX including preconfigured reoccurring On-duration periods, and to enable the DL scheduling in periods outside the On-duration periods when the UE is configured with an UL semipersistent scheduling, SPS, granting the UE UL transmission in reoccurring Transmission Time Intervals, TTIs, said Network node comprising a processor (1120) and a memory (1130) with processing software that when run on the processor causes the network node to:
  monitor a receipt of a transmission from the UE in any of the reoccurring TTIs of the SPS configuration; and responsive to the receipt of an UL transmission,
  transmit a HARQ response to the UL transmission and at the same occasion transmit an UL grant to the UE, wherein the UL grant triggers a drx-Inactivity timer to run, and while the drx-Inactivity timer is running the UE stays in DRX active mode.

Q. A network node arranged for enabling DL scheduling of an a first UE configured with DRX including preconfigured reoccurring On-duration periods, and to enable the DL scheduling in periods outside the On-duration periods, when the first UE is configured with an UL semipersistent scheduling, SPS, granting the UE UL transmission in reoccurring Transmission Time Intervals, TTIs, said Network node comprising:
  a receiver arranged for receiving signal from the UE,
  a transmitter arranged for transmitting signals to the UE,
  an UL scheduler for scheduling access to UL radio resources among one or more UE in contention for UL transmission,
  a DL scheduler for scheduling access to UL radio resources among one or more UE in contention for UL transmission, wherein the UL and DL schedulers are connected to each other for exchange of information, and connected to the transmitter for DL transmission of any scheduling decisions to the one and more UEs
  with processing software that when run on the processor causes the network node to:
  monitor a receipt of a transmission from the UE in any of the reoccurring TTIs of the SPS configuration; and responsive to the receipt of an UL transmission,
  transmit a HARQ response to the UL transmission and at the same occasion transmit an UL grant to the UE, wherein the UL grant triggers a drx-Inactivity timer to run, and while the drx-Inactivity timer is running the UE stays in DRX active mode.

R. The network node according to any of embodiments N, O, P wherein the SPS configuration is a short SPS configuration, in which the multiple occasions for UL transmissions that are granted to the UE are spread by an interval of 10 m seconds or less.

S. The network node according to any of embodiments N, O, P and Q, wherein the network node is arranged to configure the UE to refrain from sending in a SPS configured TTI unless there is a UL data or a Buffer Status Report.

The invention claimed is:

1. A method in a network node for enabling scheduling of a User Equipment (UE) configured with Discontinuous reception (DRX) and semipersistent scheduling (SPS), said method comprising:
  receiving an Uplink (UL) transmission from the UE in recurring Transmission Time Intervals (TTIs), short TTIs, slots, or sub-slots of the SPS; and
  transmitting a HARQ response to the UL transmission and, within a same occasion, transmitting an UL grant or a Downlink (DL) assignment to the UE, provided there is no upcoming preconfigured DRX On-Duration period within a specified time limit, wherein the UL grant or the DL assignment, when transmitted, triggers the UE to stay in DRX active mode for a period.

2. The method of claim 1, wherein the UL grant or the DL assignment triggers a drx-Inactivity timer to nm during which the UE stays in DRX active mode.

3. The method of claim 2, wherein said transmitting said DL assignment is made conditional that it is predicted there will be data for DL transmission in the period when the UE is staying in the DRX active mode.

4. The method of claim 3 further comprising, predicting a time when data will be available for DL transmission based on an average time for a specific logical channel between an uplink transmission and a corresponding downlink transmission, and a time of receipt of a transmission from the UE.

5. The method of claim 1, wherein said transmitting said DL assignment is made conditional that there is data buffered for DL transmission.

6. The method of claim 1, wherein said transmitting said UL grant or DL assignment is made over a Physical Downlink Control Channel (PDCCH), by use of at least one more Control Channel Element (CCE) than should have been used at normal link adaptation.

7. The method of claim 1, wherein said specified time limit is 4 milliseconds or less.

8. The method of claim 1 further comprising, in response to receiving from the UE a buffer status report that indicates there is no data for UL transmission, configuring said UL grant to adapt a size of an UL transport block to be less than a size of a transport block configured with a UL SPS.

9. The method according to claim 1, wherein a DRX command is sent to the UE triggering the UE to enter DRX inactive mode when there is no more data to be transmitted downlink.

10. The method of claim 1, wherein said transmitting said UL grant or DL assignment is made conditional that the UE is in a phase of a DRX cycle that is outside of a DRX On-duration period.

11. The method according to claim 1, in which said SPS is a short SPS granting the UE UL transmissions in recurring TTIs, short TTIs or slots that are spread by an interval of 10 milliseconds or less.

12. The method according to claim 1, wherein the network node configures the UE to refrain from transmitting in a SPS configured TTI, short TTI, slot, or sub-slot, unless there is UL data or a Buffer Status Report to transmit.

13. A network node for enabling scheduling of a User Equipment (UE) configured with Discontinuous reception (DRX) and semipersistent scheduling (SPS), said network node comprising;
  a processing circuitry; and a memory comprising instructions which, when executed on the processing circuitry, cause the network node to:
receive an Uplink (UL) transmission from the UE in recurring Transmission Time Intervals (TTIs), short TTIs, slots, or sub-slots of the SPS; and
transmit a HARQ response to the UL transmission and, within a same occasion, transmit an UL grant or a Downlink (DL) assignment to the UE, provided there is no upcoming preconfigured DRX On-Duration period within a specified time limit, wherein the UL grant or the DL assignment, when transmitted, triggers a drx-Inactivity timer to run, and while the drx-Inactivity timer is running the UE stays in DRX active mode.

14. The network node according to claim 13, wherein the SPS is a short SPS, in which the recurring TTIs, short TTIs, or slots that are granted to the UE for UL transmissions are spread by an interval of 10 milliseconds or less.

15. The network node according to claim 13, wherein the network node is to configure the UE to refrain from sending in a SPS configured TTI, short TTI, or slot, unless the UE has a UL data or a Buffer Status Report to transmit.

* * * * *